United States Patent
Li et al.

(10) Patent No.: US 11,539,888 B2
(45) Date of Patent: Dec. 27, 2022

(54) METHOD AND APPARATUS FOR PROCESSING VIDEO DATA

(71) Applicant: BEIJING DAJIA INTERNET INFORMATION TECHNOLOGY CO., LTD., Beijing (CN)

(72) Inventors: Qian Li, Beijing (CN); Ying Shu, Beijing (CN); Shanshan Mao, Beijing (CN)

(73) Assignee: BEIJING DAIJA INTERNET INFORMATION TECHNOLOGY CO., LTD., Beijing (CN)

( * ) Notice: Subject to any disclaimer, the term of this patent is extended or adjusted under 35 U.S.C. 154(b) by 23 days.

(21) Appl. No.: 17/178,496

(22) Filed: Feb. 18, 2021

(65) Prior Publication Data
US 2021/0297595 A1 Sep. 23, 2021

(30) Foreign Application Priority Data

Mar. 17, 2020 (CN) .................... 202010187207.X

(51) Int. Cl.
*H04N 5/232* (2006.01)
*H04N 5/235* (2006.01)

(52) U.S. Cl.
CPC ....... *H04N 5/23267* (2013.01); *H04N 5/2353* (2013.01); *H04N 5/23229* (2013.01); *H04N 5/23245* (2013.01); *H04N 5/232933* (2018.08); *H04N 5/232941* (2018.08)

(58) Field of Classification Search
CPC ........... H04N 5/23245; H04N 5/23248; H04N 5/23267; H04N 5/232933; H04N 5/232941; H04N 5/2353; H04N 5/23229
See application file for complete search history.

(56) References Cited

U.S. PATENT DOCUMENTS

| | | | |
|---|---|---|---|
| 2011/0109752 A1 | 5/2011 | Lee | |
| 2017/0208250 A1* | 7/2017 | Uemura | ........... H04N 5/232945 |
| 2019/0320118 A1 | 10/2019 | Ma et al. | |

FOREIGN PATENT DOCUMENTS

| | | |
|---|---|---|
| CN | 1791221 A | 6/2006 |
| CN | 103685950 A | 3/2014 |
| CN | 104601897 A | 5/2015 |
| CN | 109151323 A | 1/2019 |
| CN | 110072070 A | 7/2019 |

(Continued)

OTHER PUBLICATIONS

Chinese Office Action dated Dec. 25, 2020, from application No. 202010187207.X.

(Continued)

*Primary Examiner* — Daniel M Pasiewicz

(74) *Attorney, Agent, or Firm* — Foley & Lardner LLP

(57) ABSTRACT

The disclosure relates to a method for processing video data, apparatus, electronic equipment, and storage medium. The method for processing video data can include switching to a target anti-shake shooting mode in response to acquiring a switching operation in a video shooting interface; acquiring a video editing operation corresponding to the target anti-shake shooting mode; obtaining target video data by processing video data collected in real time based on the video editing operation; and outputting the target video data in the video shooting interface.

20 Claims, 4 Drawing Sheets

(56) References Cited

FOREIGN PATENT DOCUMENTS

| | | |
|---|---|---|
| CN | 110113483 A | 8/2019 |
| CN | 110636223 A | 12/2019 |

OTHER PUBLICATIONS

Evaluation Guide, "OPPO Reno3 Pro experience: Unlock the future 5G real experience in advance," Computer News, Jan. 6, 2020, Edition 008, 17 pages.

\* cited by examiner

METHOD AND APPARATUS FOR PROCESSING VIDEO DATA

CROSS-REFERENCE TO RELATED APPLICATIONS

This application claims the priority of the Chinese Patent Application No. 202010187207.X, filed with China National Intellectual Property Administration on Mar. 17, 2020, the disclosure of which is herein incorporated by reference in its entirety.

TECHNICAL FIELD

The disclosure relates to the field of data processing, and in particular to a method for processing video data, apparatus, electronic equipment, and storage medium.

BACKGROUND

In the process of shooting video, an anti-shake shooting function that makes captured video pictures clearer and more stable has become one of indispensable functions of shooting video applications. However, the anti-shake shooting function provided by existing applications has a single processing method for video pictures. With the emergence of shooting devices with multiple cameras, focal lengths of different cameras are often different, and the video pictures captured are also different. The single processing method of application for the video pictures causes the stability and definition of the captured video pictures to be greatly reduced, and the anti-shake shooting performance is poor.

SUMMARY

According to a first aspect of the implementations of the disclosure, a method for processing video data is provided. The method for processing video data includes: switching to a target anti-shake shooting mode in response to acquiring a switching operation in a video shooting interface; acquiring a video editing operation corresponding to the target anti-shake shooting mode; obtaining target video data by processing the video data collected in real time based on the video editing operation; and outputting the target video data in the video shooting interface.

According to a second aspect of the implementations of the disclosure, an apparatus for processing video data is provided. The apparatus for processing video data includes an operation response module configured to switch to a target anti-shake shooting mode in response to acquiring a switching operation in a video shooting interface; a video processing module configured to acquire a video editing operation corresponding to the target anti-shake shooting mode and obtain target video data by processing the video data collected in real time based on the video editing operation; and a video output module configured to output the target video data in the video shooting interface.

According to a third aspect of the disclosure, there is provided electronic equipment. The electronic equipment includes a processor and a memory for storing instructions executable by the processor. The processor is configured to implement the method for processing video data as described in any one of the implementations of the first aspect.

According to a fourth aspect of the disclosure, there is provided a storage medium having a computer instruction stored thereon, when the computer instruction being executed by a processor of an electronic device, enable the electronic device to implement the method for processing video data as described in any one of the implementations of the first aspect.

According to a fifth aspect of the implementations of the disclosure, there is provided a computer program product including a computer program, the computer program is stored in a readable storage medium, and the computer program is read from the readable storage medium and executed by at least one processor of a device, so that the device executes the method for processing video data described in any one of the implementations of the first aspect.

It should be understood that the above general description and the following detailed description are only example and explanatory, and cannot limit the disclosure.

BRIEF DESCRIPTION OF THE DRAWINGS

The drawings herein are incorporated into the specification and constitute a part of the specification, show implementations that conform to the disclosure, and are used with the specification to explain the principle of the disclosure.

DETAILED DESCRIPTION

In order to enable those of ordinary skill in the art to better understand the technical solutions of the disclosure, the technical solutions in the implementations of the disclosure will be described clearly and completely with reference to the accompanying drawings.

It should be noted that the terms "first" and "second" in the specification and claims of the disclosure and the above-mentioned drawings are used to distinguish similar objects, and not necessarily used to describe a specific sequence or order. It should be understood that the data used in this way can be interchanged under appropriate circumstances so that the implementations of the disclosure described herein can be implemented in an order other than those illustrated or described herein. The implementation manners described in the following implementations do not represent all implementation manners consistent with the disclosure. Rather, they are merely examples of devices and methods consistent with some aspects of the disclosure as detailed in the appended claims.

Figure 1:
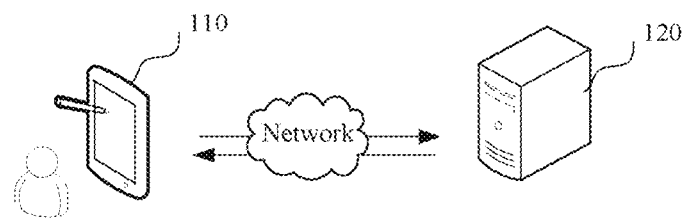
FIG. 1 is a diagram showing an application environment of a method for processing video data according to some implementations.

The method for processing video data provided by the disclosure can be applied to an application environment as shown in FIG. 1. In the application environment, a terminal 110 communicates with a server 120 through a network. The terminal 110 may be, but is not limited to, various personal computers, notebook computers, smart phones, tablet computers, and portable wearable devices. The server 120 may be implemented as an independent server or a server cluster composed of multiple servers.

The terminal 110 can display a video shooting interface through a display device, detect and acquire a switching operation for an anti-shake shooting mode, switch to a target anti-shake shooting mode in response to the switching operation, and then acquire a video editing operation corresponding to the target anti-shake shooting mode (i.e., the switched anti-shake shooting mode); process the video data collected in real time based on the video editing operation, so as to obtain target video data (i.e., the processed video data); output the target video data on the video shooting interface.

The above application environment is just an example. In some implementations, the terminal 110 may also send the video editing operation corresponding to the target anti-shake shooting mode and video data collected in real time to the server 120. The server 120 may process the video data collected in real time based on video editing operation, and return the processed video data (i.e., the target video data) to the terminal 110, and then the terminal 110 may output the processed video data on the video shooting interface.

Figure 2:
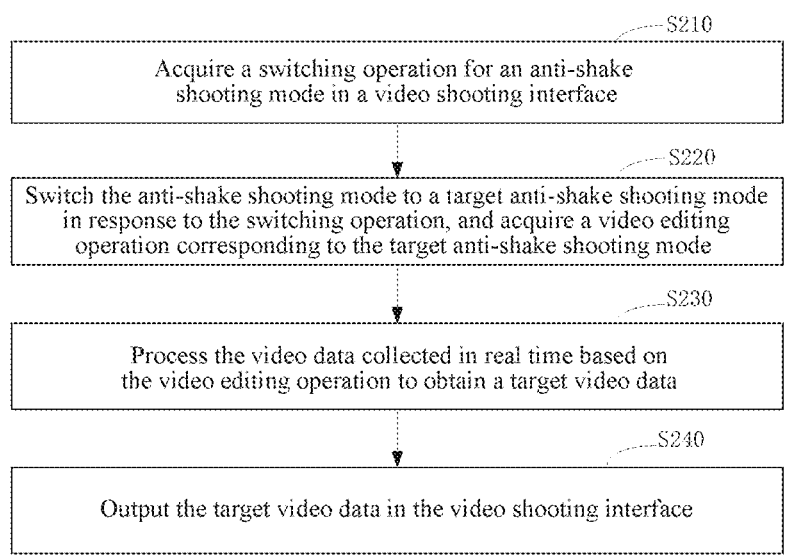
FIG. 2 is a flowchart showing a method for processing video data according to some implementations.

FIG. 2 is a flow chart showing a method for processing video data according to some implementations. As shown in FIG. 1, the method for processing video data is used in a terminal and includes the following blocks.

In block S210, acquiring a switching operation for an anti-shake shooting mode in a video shooting interface. In some implementations, the terminal may acquire a switching operation for an anti-shake shooting mode in a video shooting interface.

In block S220, in response to the switching operation for the anti-shake shooting mode, switching the anti-shake shooting mode to a target anti-shake shooting mode, and acquiring a video editing operation corresponding to the target anti-shake shooting mode. In some implementations, the terminal may switch the anti-shake shooting mode to a target anti-shake shooting mode and acquire a video editing operation corresponding to the target anti-shake shooting mode in response to the switching operation for the anti-shake shooting mode.

In block S230, processing video data collected in real time based on the video editing operation, so as to obtain processed video data (i.e., target video data). In some implementations, the terminal may process video data collected in real time based on the video editing operation, so as to obtain processed video data.

In block S240, outputting the processed video data in the video shooting interface. In some implementations, the terminal may output the processed video data in the video shooting interface.

Figures 3A, 3B:
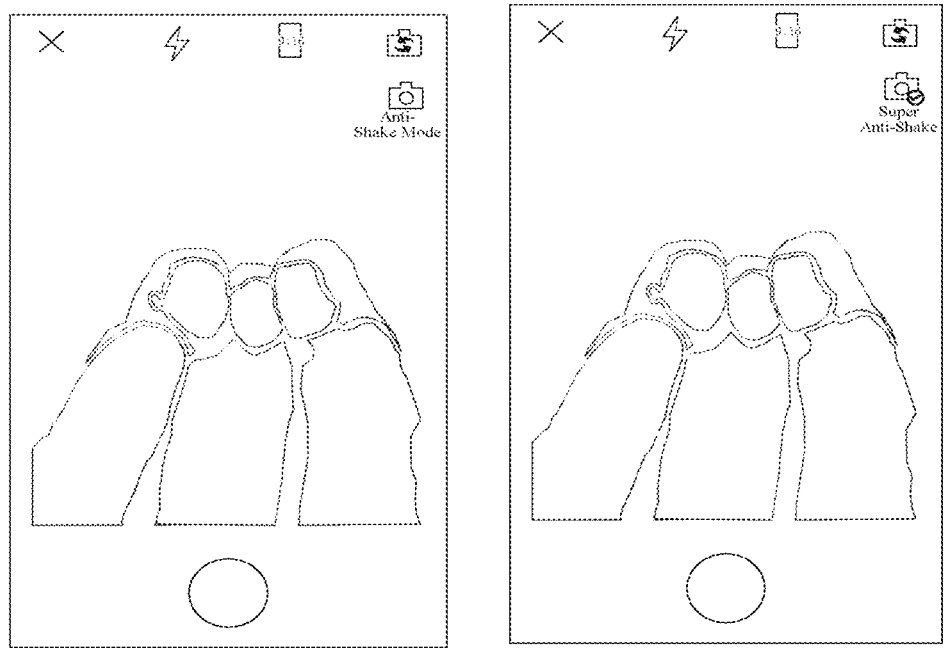
FIG. 3A is a schematic diagram showing a video shooting interface according to some implementations.
FIG. 3B is a schematic diagram showing a video shooting interface according to some implementations.

In the disclosure, the video shooting interface refers to an interface presented when the terminal runs an application. In some implementations, the video shooting interface includes a video picture preview area and a video shooting parameter control area. The video picture preview area can be used to display a picture shot in real time by the current camera, and the video shooting parameter control area is used to display setting icons of various types of parameter needed for shooting the current picture. The setting icons may include, but are not limited to, a flash on-off icon, an aspect ratio setting icon, a camera switching icon, an anti-shake shooting mode switching icon, and so on. FIG. 3A shows a video shooting interface according to some implementations. As shown in FIG. 3A, the video shooting parameter control area in the video shooting interface includes a flash on-off icon, an aspect ratio setting icon, a camera switching icon, an anti-shake shooting mode switching icon. The switching operation of the anti-shake shooting mode can be triggered by clicking a virtual button (the anti-shake shooting mode switching icon shown in FIG. 3A) in the video shooting interface displayed on the touch display screen of the terminal. The switching operation of the anti-shake shooting mode can also be triggered by pressing a physical button of the terminal, or by controlling voice, which is not specifically limited herein.

In some implementations, after acquiring the switching operation for the anti-shake shooting mode, the terminal may switch the anti-shake shooting mode in response to the switching operation. For example, the anti-shake shooting mode switching may include switching from the anti-shake shooting mode in off state to the anti-shake shooting mode in on state; or switching from the anti-shake shooting mode in on state to anti-shake shooting mode in off state. When the anti-shake shooting mode includes multiple different anti-shake shooting modes, the anti-shake shooting mode switching may include switching from a first anti-shake shooting mode to a second anti-shake shooting mode, which is not specifically limited herein. It is understood that in different anti-shake shooting modes, the client has different video editing operations for the video data. For example, the video editing operation corresponding to the anti-shake shooting mode in off-state as mentioned above is an operation which crops each frame of the video data in a certain aspect ratio, while the video editing operation corresponding to the on-state anti-shake shooting mode as mentioned above is an operation which do not crop every frame of the video data. For example, the video editing operations corresponding to the first anti-shake shooting mode and the second anti-shake shooting mode mentioned above are operations which crop each frame of the video data with different aspect ratios, respectively.

After switching the anti-shake shooting mode in response to the switching operation, the terminal may determine the switched anti-shake shooting mode, and acquire the video editing operation corresponding to the switched anti-shake shooting mode. After the video data is collected in real time, the terminal may process the collected video data based on the acquired video editing operation, so as to obtain the processed video data, and then display the processed video data in the video shooting interface.

For example, the user can operate the terminal through an interface and shoot video by using a video capture application in the terminal. During the process of using the video capture application of the terminal, the anti-shake shooting mode of the video capture application is an anti-shake off mode in off state by default, and a virtual button for the anti-shake shooting mode switching is set in the video shooting interface, as shown in FIG. 3A. The user can click the virtual button to trigger a switching operation for the anti-shake shooting mode. After obtaining the switching operation for the anti-shake shooting mode, the terminal switch the anti-shake shooting mode in response to the switching operation, so as to switch from the anti-shake off mode to a first anti-shake shooting mode, and acquire a video editing operation for video data in the first anti-shake shooting mode. After collecting the video data in real time through the camera, the terminal may process the collected video data according to the video editing operation, so as to acquire processed video data, and display the processed video data in the video shooting interface to realize anti-shake video shooting. The processed video data are video data which make the picture smooth.

For another example, during the process of using the video shooting application of the terminal, when the anti-shake shooting mode of the video shooting application is a first anti-shake shooting mode, the user can click the virtual button for switching the anti-shake shooting mode to trigger a switching operation for the anti-shake shooting mode. After obtaining the switching operation for the anti-shake shooting mode, the terminal switch the anti-shake shooting mode in response to the switching operation, so as to switch from the first anti-shake shooting mode to a second anti-shake shooting mode, and acquire a video editing operation for video data in the second anti-shake shooting mode. After collecting the video data in real time through the camera, the terminal may process the collected video data according to the video editing operation, so as to acquire the processed video data. The processed video data are video data which make the picture smooth, thus realize anti-shake video shooting.

In the above methods for processing video data, switching the manipulation of video data in response to the switching operation for the anti-shake shooting mode can be realized by the following ways: acquiring, in a video shooting interface, a switching operation for an anti-shake shooting mode; switching the anti-shake shooting mode in response to the switching operation and acquiring a video editing operation corresponding to the switched anti-shake shooting mode; processing video data collected in real time based on the video editing operation to obtain processed video data; and finally outputting the processed video data in the video shooting interface, thus providing diversified video picture processing ways, realizing different processings for the video pictures shot by different cameras, effectively improving the stability and definition of the shot video pictures, and improving the anti-shake shooting performance. At the same time, the user can trigger the switching operation for the anti-shake shooting mode according to the actual situation of the shooting scene, thus it is possible to turn on the anti-shake shooting function, turn off the anti-shake shooting function, or switching between different anti-shake shooting modes in the case of that the anti-shake shooting function is turned on, which provides users with the possibility of scene selection and enhances the creative experience of video producers.

In some implementations, the block of switching the anti-shake shooting mode in response to the switching operation and acquiring the video editing operation corresponding to the switched anti-shake shooting mode (i.e., block S220) includes: determining a current anti-shake shooting mode, the current anti-shake shooting mode is an anti-shake shooting mode that the terminal is in before acquiring the switching operation; in response to the switching operation, determining a target anti-shake shooting mode based on the current anti-shake shooting mode; switching the current anti-shake shooting mode to the target anti-shake shooting mode; acquiring the video editing operation corresponding to the target anti-shake shooting mode.

Among them, after the switching operation for the anti-shake shooting mode is acquired, in response to the switching operation, the terminal determines the target anti-shake shooting mode based on the current anti-shake shooting mode. The current anti-shake mode is an anti-shake shooting mode before acquiring the switching operation, and then determines the video editing operation according to the target anti-shake shooting mode.

Figure 3C:
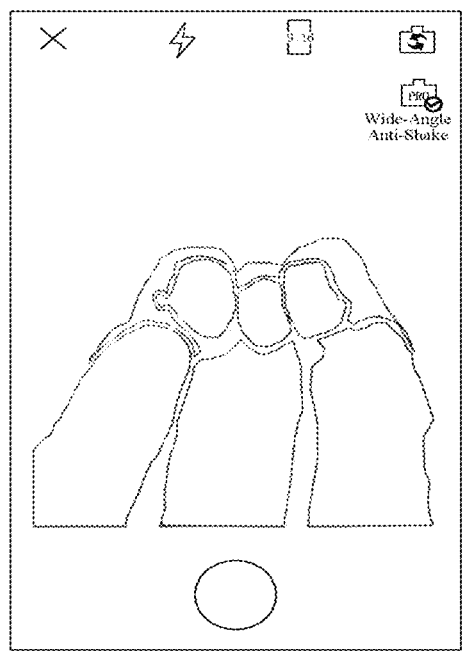
FIG. 3C is a schematic diagram showing a video shooting interface according to some implementations.

For example, in some implementations, in an actual application scenario, the anti-shake shooting mode may include an anti-shake off shooting mode, a super anti-shake mode, and a wide-angle anti-shake mode. The super anti-shake mode may refer to a mode in which process a screen image shot by a standard camera to acquire video data making the screen image smooth. The wide-angle anti-shake mode can refer to a mode in which process a screen image shot by a wide-angle camera to acquire video data making the screen image smooth. The anti-shake off shooting mode may refer to a mode in which the screen image shot by the standard camera or wide-angle camera are not processed in any way. It is understandable that the wide-angle camera is a photographic lens with a shorter focal length than a standard lens and a larger viewing angle than a standard camera. The characteristic of the wide-angle camera is that it has a larger lens angle of view and a wider field of view, and it can acquire a larger shooting area than a standard camera. In the process of using the video shooting application, the anti-shake shooting mode of the video shooting application defaults to the anti-shake off mode in off state. After obtaining a switching operation for the anti-shake shooting mode, the terminal may switch the anti-shake shooting mode in response to the switching operation, that is switching from the anti-shake off mode to the super anti-shake mode, the video shooting interface at this point can be shown in FIG. 3B. When a switching operation for the anti-shake shooting mode is acquired again, the terminal responds to the switching operation to switch the anti-shake shooting mode, i.e., switching from the super anti-shake mode to the wide-angle anti-shake mode. At this time, the video shooting interface can be shown in FIG. 3C. When a switching operation for anti-shake shooting mode is acquired once again, the terminal responds to the switching operation to switch the anti-shake shooting mode, switching from the wide-angle anti-shake mode to the anti-shake off mode. When a switch operation for the anti-shake shooting mode is acquired once again, the terminal responds to the switching operation to switch the anti-shake shooting mode, switching from the anti-shake off mode to the super anti-shake mode again, and keep the cycle repeat.

In some implementations, all the switchings such as from anti-shake off mode to super anti-shake mode, from super anti-shake mode to wide-angle anti-shake mode, and from wide-angle anti-shake mode to anti-shake off mode, that is, the anti-shake shooting mode switchings, can be triggered by clicking a same virtual button (for example, the anti-shake shooting mode switching icon shown in FIG. 3A) or a same physical button in the video shooting interface, which is convenient for users to quickly operate.

In some implementations, after the block of determining the target anti-shake shooting mode based on the current anti-shake shooting mode, in response to the switching operation, the method further includes: displaying a prompt message corresponding to the target anti-shake shooting mode in the video shooting interface.

For example, the prompt information is used to remind the user of the current video shooting mode. For example, when switching from the anti-shake shooting mode in the on state to the anti-shake shooting mode in the off state, the prompt message "Anti-Shake Shooting Mode is OFF" can be displayed in the video shooting interface. For example, when switching from the first anti-shake shooting mode to the second anti-shake shooting mode, the prompt message "Second Anti-Shake Shooting Mode is ON" can be displayed in the video stone interface, and so on.

Figure 3D:
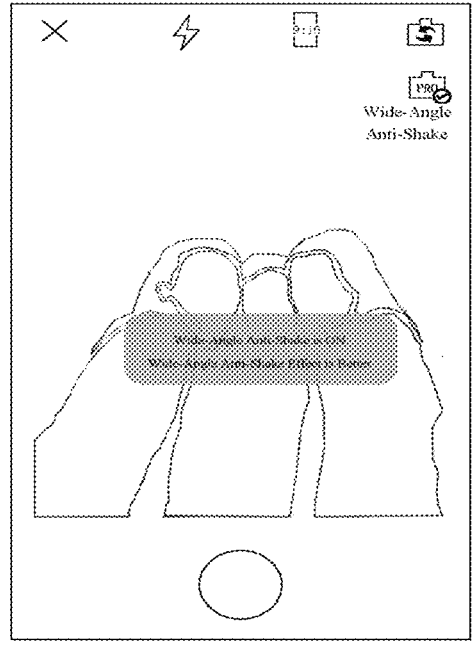
FIG. 3D is a schematic diagram showing a video shooting interface according to some implementations.

In some implementations, as shown in FIG. 3D, taking a first anti-shake shooting mode as the super anti-shake mode and a second anti-shake shooting mode as the wide-angle anti-shake mode as an example, when switching from the first anti-shake shooting mode to the second anti-shake shooting mode, that is, when switching from super anti-shake mode to wide-angle anti-shake mode, the prompt message "Wide-Angle Anti-Shake is ON, Wide-Angle Anti-Shake Effect is Better" is displayed in the video shooting interface.

In these implementations, the prompt information corresponding to the target anti-shake shooting mode is displayed in the video shooting interface, so that the user can quickly learn the shooting mode of the current video shooting, and the shooting mode can be adjusted in a targeted manner to increase convenience.

In some implementations, the video editing operation includes a cropping operation. The block of processing video data collected in real time based on the video editing operation to obtain the processed video data includes: acquiring single frame images of the video data collected in real time; cropping the single frame images based on the video editing operation, which can be a cropping operation, so as to obtain the cropped single frame images, that is target single frame images; generating video data based on the cropped single frame images, thus obtaining the processed video data.

Among them, the single frame images refer to screen images collected in real time. For example, the terminal collects video data in real time, and according to the video editing operation corresponding to the switched anti-shake shooting mode, crops the single frame images corresponding to the real-time collected screen image to acquire the cropped single frame images, that is the target single frame images, and finally generates the processed video data making the screen image smooth, based on the target single frame images.

For example, the single frame images are cropped. For example, an edge of the single frame images may be cropped at a certain ratio. Take a first anti-shake shooting mode as the super anti-shake mode, and a second anti-shake shooting mode as the wide-angle anti-shake mode as an example. In the super anti-shake mode, edges of the single frame images are cropped in a first ratio, such as a 20% crop ratio, while in the wide-angle anti-shake mode, because the wide-angle camera can obtain a larger shooting area than the standard camera, edges of the single frame images is cropped in a second ratio larger than the first ratio, such as a 40% crop ratio, to obtain the processed video data which making the screen image more stable and smooth, thus realizing better video anti-shake shooting effect.

Further, in some implementations, the video editing operation includes a cropping operation, and the block of acquiring the video editing operation corresponding to the switched anti-shake shooting mode includes: adjusting a cropping ratio of the cropping operation based on the switched anti-shake shooting mode to determine the video editing operation corresponding to the switched anti-shake shooting mode.

The video editing operation includes a cropping operation used for cropping each frame of the video data, and the cropping ratio refers to a scale of a screen image when it is cropped. After switching the anti-shake shooting mode in response to the switching operation, the terminal adjusts the cropping ratio of the cropping operation according to the switched anti-shake shooting mode, and finally obtains the video editing operation of the switched anti-shake mode.

For example, taking a first anti-shake shooting mode as the super anti-shake mode and a second anti-shake shooting mode as the wide-angle anti-shake mode as an example, in the super anti-shake mode, each of single frame images of the video data is cropped at edge in a first ratio, such as 20% cropping ratio, while in the wide-angle anti-shake mode, because the wide-angle camera can obtain a larger shooting area than the standard camera, each of single frame images of the video data is cropped at edge in a second ratio larger than the first ratio, such as 40% cropping ratio, to obtain the processed video data which making the screen image more stable and smooth, thus realizing better video anti-shake shooting effect. After receiving the switching operation of the anti-shake mode, the terminal switches from the super anti-shake mode to the wide-angle anti-shake mode in response to the switching operation. At this time, the terminal changes the cropping ratio of the cropping operation from 20% to 40% based on the switched wide-angle anti-shake mode, to obtain the video editing operation in wide-angle anti-shake mode.

In some implementations, before processing the video data collected in real time based on the video editing operation, the method further includes: adjusting a video collection frame rate in response to the switching operation; and collecting video data in real time based on the adjusted video collection frame rate.

Among them, the video collection frame rate refers to the number of frames of the image per second acquired during the video shooting process. After acquiring the switching operation for the anti-shake shooting mode, the terminal adjusts the video collection frame rate in response to the switching operation, and collecting video data in real time based on the adjusted video collection frame rate, For example, after acquiring the switching operation for the anti-shake shooting mode, the terminal switches the anti-shake shooting mode in response to the switching operation, to switch from super anti-shake mode to wide-angle anti-shake mode, and at same time the terminal adjusts the video collection frame rate to a higher collection frame rate. For example, the video collection frame rate is adjusted from 30 frames per second to 60 frames per second. And then the terminal collects video data in real time based on the adjusted video collection frame rate, which makes the video pictures more coherent and improves the video shooting effect. After the single frame images of the video data is edited and processed, the video picture is made more stable and the video anti-shake effect is improved.

For another example, after acquiring the switching operation for the anti-shake shooting mode, the terminal switches the anti-shake shooting mode in response to the switching operation, to switch from the wide-angle anti-shake mode to the anti-shake off mode, and at same time the terminal adjusts the video collection frame rate to a lower collection frame rate. For example, the video collection frame rate is adjusted from 60 frames per second to 30 frames per second. And then the terminal collects video data in real time based on the adjusted video collection frame rate, which effectively reduces the occupancy rate of collected video data to terminal performance while ensuring the coherent of the video pictures.

In these implementations, after acquiring the switching operation for the anti-shake shooting mode, the video collection frame rate is adaptively adjusted according to the switching operation to ensure natural and smooth picture connection in the video data, and eliminate motion jitter and motion trailing, thus making the video picture more clear and smooth.

In some implementations, before acquiring the switching operation for the anti-shake shooting mode, the method further includes: acquiring a conversion operation for switching cameras, and switching a camera, which is used to collecting video data in response to the conversion operation; in response to the camera being a target camera, switching the anti-shake shooting mode to an anti-shake off mode; and setting an icon corresponding to the anti-shake shooting mode in the video shooting interface grayed.

Figure 3E:
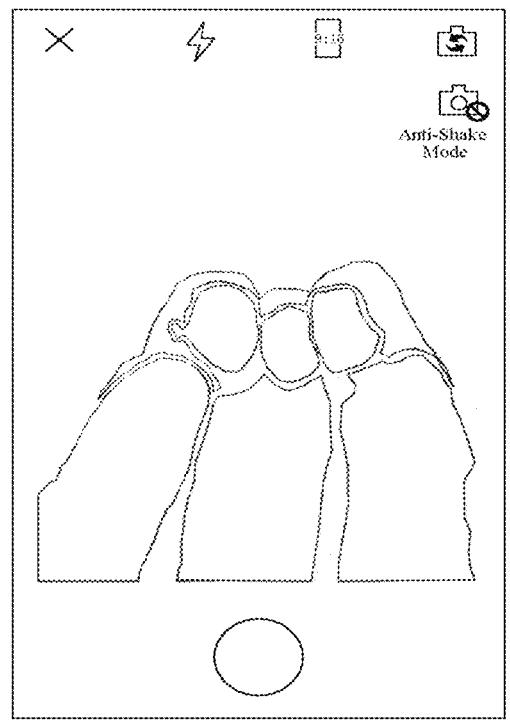
FIG. 3E is a schematic diagram showing a video shooting interface according to some implementations.

Among them, the setting grayed processing refers to limiting the trigger operation for the icon corresponding to the anti-shake shooting mode, that is, stop acquiring the switching operation for the anti-shake shooting mode. For example, the switching operation for the anti-shake shooting mode will not be triggered by clicking the virtual button displayed in the video shooting interface via the touch of the terminal' touch screen. Furthermore, the icon corresponding to the anti-shake shooting mode in the video shooting interface is grayed out. In some implementations, while stopping the acquisition of the switch operation for the anti-shake shooting mode, the icon corresponding to the anti-shake shooting mode in the video shooting interface can be grayed out. In some implementations, the icon corresponding to the anti-shake shooting mode in the video shooting interface can be displayed as a prohibited icon, as shown in FIG. 3E.

In the actual application process, the terminal includes multiple different types of cameras. When switching the camera to a camera that does not support the anti-shake shooting mode in response to the conversion operation for the cameras, the terminal switches the anti-shake shooting mode to the anti-shake off mode and sets the icon corresponding to the anti-shake shooting mode grayed, so as to stop receiving the switching operation for the anti-shake shooting mode. Further, corresponding prompt information can be displayed in the video shooting interface.

For example, if the terminal is a smart phone, a front-facing camera of the smart phone does not support the anti-shake shooting mode, so when the camera that collects video data on the terminal is switched to the front-facing camera, that is, when the terminal is performing a front-facing shooting, the icon corresponding to the anti-shake shooting mode is grayed out in the video shooting interface, and the prompt information "Front-Facing Camera Does Not Support Anti-Shake Shooting At This Time." by a pop-up window.

Figure 4:
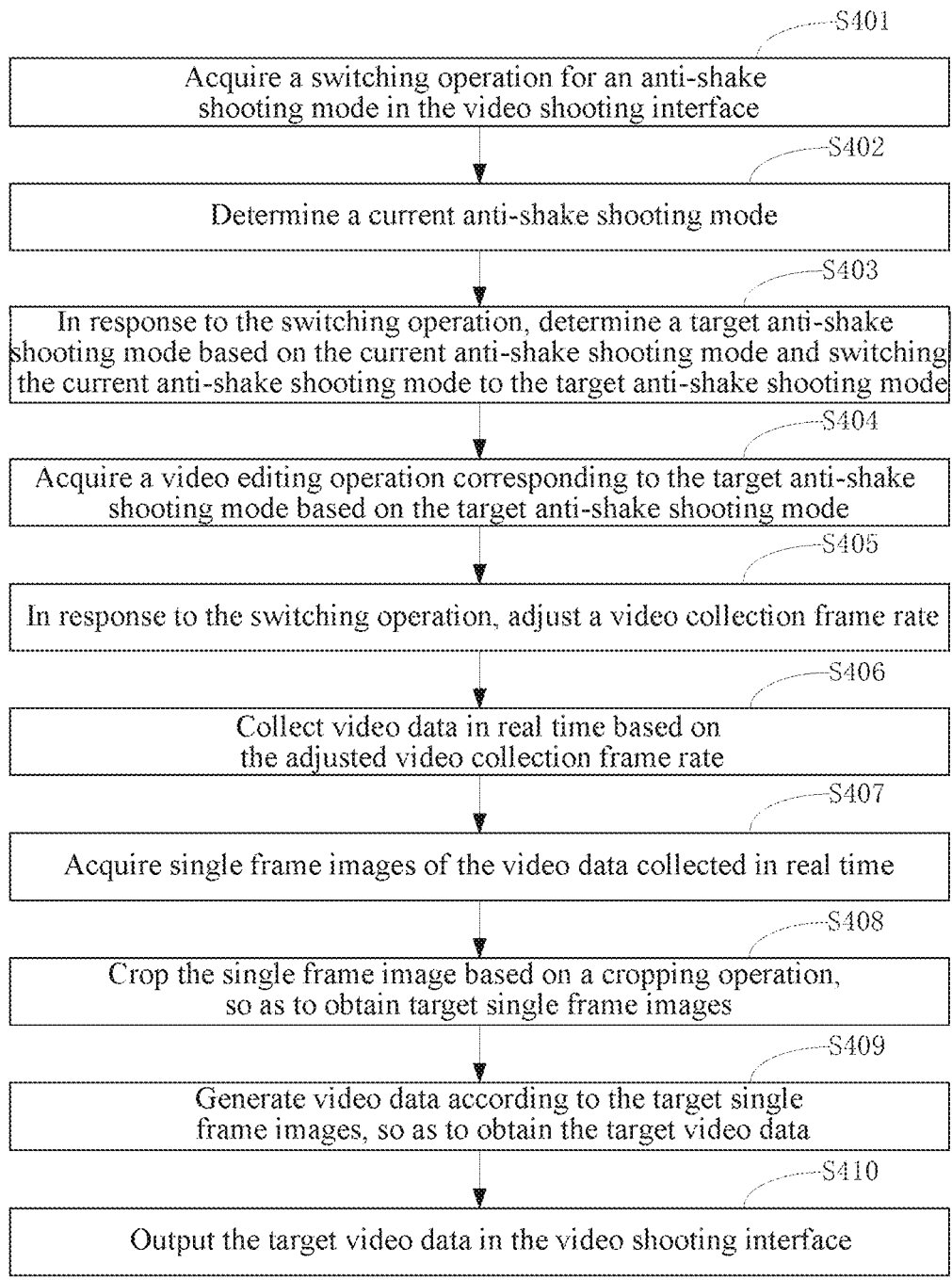
FIG. 4 is a flow chart showing a method for processing video data according to some implementations.

FIG. 4 is a flowchart of a method for processing video data according to some implementations. In some implementations, as shown in FIG. 4, the method processing video data includes the following blocks.

In block S401, acquiring a switching operation for an anti-shake shooting mode in the video shooting interface. In some implementations, the terminal may acquire a switching operation for an anti-shake shooting mode in the video shooting interface.

In block S402, determining a current anti-shake shooting mode. In some implementations, the terminal may determine a current anti-shake shooting mode.

In block S403, in response to the switching operation, determining a target anti-shake shooting mode based on the current anti-shake shooting mode and switching the current anti-shake shooting mode to the target anti-shake shooting mode. In some implementations, the terminal may determine a target anti-shake shooting mode based on the current anti-shake shooting mode and switch the current anti-shake shooting mode to the target anti-shake shooting mode in response to the switching operation.

In block S404, acquiring a video editing operation corresponding to the target anti-shake shooting mode based on the target anti-shake shooting mode. In some implementations, the terminal may acquire a video editing operation corresponding to the target anti-shake shooting mode based on the target anti-shake shooting mode.

In S405, in response to the switching operation, adjusting a video collection frame rate. In some implementations, the terminal may adjust a video collection frame rate in response to the switching operation.

In S406, collecting video data in real time according to the adjusted video collection frame rate. In some implementations, the terminal may collect video data in real time according to the adjusted video collection frame rate.

In S407, acquiring single frame images of the video data collected in real time. In some implementations, the terminal may acquire single frame images of the video data collected in real time.

In S408, cropping the single frame images based on a cropping operation, so as to obtain target single frame images. In some implementations, the terminal may crop the single frame images based on a cropping operation, so as to obtain target single frame images.

In S409, generating video data according to the target single frame images, so as to obtain the processed video data (i.e., the target video data). In some implementations, the terminal may generate video data according to the target single frame images, so as to obtain the processed video data.

In S410, outputting the processed video data in the video shooting interface. In some implementations, the terminal may output the processed video data in the video shooting interface.

For example, in the process of using the video shooting application, the anti-shake shooting mode of the video shooting application is the super anti-shake mode, and the user can click the virtual button for switching the anti-shake shooting mode to trigger the switching operation for the anti-shake shooting mode. After acquiring the switching operation for the anti-shake shooting mode, the terminal responds to the switching operation to switch the anti-shake shooting mode, so as to switch from the super anti-shake mode to the wide-angle anti-shake mode, and obtain the video editing operation for the video data in the wide-angle anti-shake mode; at the same time, the terminal adjusts the video collection frame rate to a higher collection frame rate, for example, adjusts the video collection frame rate from 30 frames per second to 60 frames per second, and collect video in real time based on the adjusted video collection frame rate data; at this time, the terminal collects the video data in real time through the wide-angle camera, and based on the wide-angle anti-shake mode corresponding to the video editing operation, edges of the real-time collected single frame images are cropped at a certain frame ratio, so as to obtain target single frame images; after obtaining the target single frame images, generates processed video data (i.e., the target video data) according to the target single frame images. The processed video data is video data making the picture smooth, thus realizing anti-shake shooting under the wide-angle camera.

It should be understood that although the blocks of the flowchart of FIG. 2 or FIG. 4 are displayed in sequence as indicated by the arrows, these blocks are not necessarily performed in the order indicated by the arrows. Unless specifically stated in the disclosure, the execution of these blocks is not strictly restricted in order, and these blocks can be executed in other orders. Moreover, at least part of the blocks in FIG. 2 or FIG. 4 may include multiple sub-blocks or multiple stages. These sub-blocks or stages are not necessarily executed at the same time, but can be executed at different times. The order of execution these sub-blocks or stages is not necessarily performed sequentially, but may be performed alternately with other sub-blocks or at least a part of the sub-blocks or stages in other block.

Figure 5:
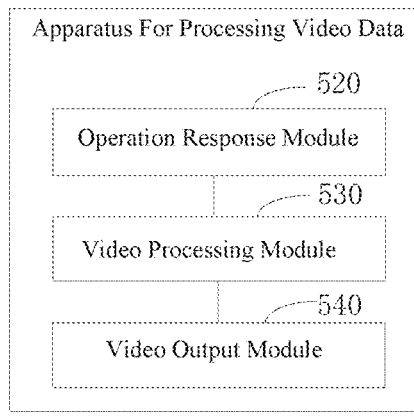
FIG. 5 is a block diagram showing an apparatus for processing video data according to some implementations.

FIG. 5 is a block diagram showing an apparatus for processing video data according to some implementations. Referring to FIG. 5, the apparatus includes an operation response module 520, a video processing module 530, and a video output module 540.

The operation response module 520 is configured to switch to a target anti-shake shooting mode in response to acquiring a switching operation in a video shooting interface.

The video processing module 530 is configured to acquire a video editing operation corresponding to the target anti-shake shooting mode and obtain target video data by processing the video data collected in real time based on the video editing operation.

The video output module 540 is configured to output the processed video data in the video shooting interface.

In some implementations, the operation response module is configured to determine a current anti-shake shooting mode, the current anti-shake shooting mode is an anti-shake shooting mode before acquiring the switching operation; in response to the switching operation, determine a target anti-shake shooting mode after the switching based on the current anti-shake shooting mode; and based on the target anti-shake shooting mode, acquire the video editing operation corresponding to the target anti-shake shooting mode.

In some implementations, the operation response module is configured to display a prompt message corresponding to the target anti-shake shooting mode in the video shooting interface.

In some implementations, the video editing operation including a cropping operation; and the operation processing module is configured to acquire single frame images of the video data collected in real time; crop the single frame images based on the cropping operation to obtain target single frame images; and generate the processed video data based on the target single frame images.

In some implementations, the video editing operation including a cropping operation; and the operation response module is configured to adjust a cropping ratio of the cropping operation based on the switched anti-shake shooting mode, so as to determine the video editing operation corresponding to the switched anti-shake shooting mode.

In some implementations, the apparatus for processing video data further include a frame rate adjusting module, which is configured to adjust a video collection frame rate in response to the switching operation; and collect video data in real time based on the adjusted video collection frame rate.

In some implementations, the apparatus for processing video data further include a camera switching module, which is configured to acquire a conversion operation for cameras, and switching to a camera for collecting video data in response to the conversion operation; in response to the camera being a target camera, switch the anti-shake shooting mode to the anti-shake off mode; and set an icon corresponding to the anti-shake shooting mode in the video shooting interface grayed.

Regarding the apparatus in the above implementations, the specific manners and beneficial effects of operations performed by each module therein have been described in detail in the implementations related to the method, and detailed description will not be given here.

Figure 6:
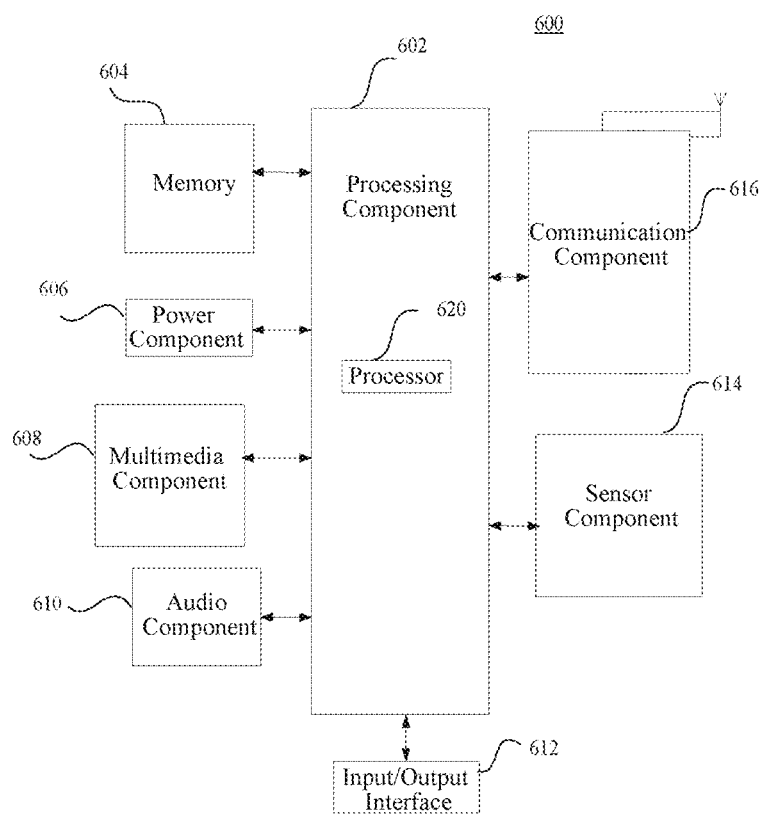
FIG. 6 is a diagram showing the internal structure of electronic equipment according to some implementations.

FIG. 6 is a block diagram of a device 600 for processing video data shown in some implementations. For example, the electronic device 600 may be a mobile phone, a computer, a digital broadcasting terminal, a messaging device, a game console, a tablet device, a medical device, a fitness device, a personal digital assistant, or the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operations of the device 600, such as the operations associated with display, telephone calls, data communications, camera operations, and recording operations. The processing component 602 can include one or more processors 620 to execute instructions, so as to complete all or part of the blocks of the above-mentioned video data processing method. In addition, the processing component 602 can include one or more modules to facilitate the interaction between the processing component 602 and other components. For example, the processing component 602 can include a multimedia module to facilitate the interaction between the multimedia component 608 and the processing component 602.

The memory 604 is configured to store various types of data to support the operation of the device 600. Examples of such data include instructions for any application or method operated on the device 600, such as the contact data, the phone book data, messages, pictures, videos, and the like. The memory 604 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 606 provides power to various components of the device 600. The power component 606 can include a power management system, one or more power sources, and other components associated with the generation, management, and distribution of power in the electronic device 600.

The multimedia component 608 includes a screen providing an output interface between the device 600 and the user. In some implementations, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some implementations, the multimedia component 608 includes a front camera and/or a rear camera. When the device 600 is in an operation mode, such as a photographing mode or a video mode, the front camera and/or the rear camera can receive external multimedia data. Each of the front camera and the rear camera may be a fixed optical lens system or have focus and optical zoom capability.

The audio component 610 is configured to output and/or input an audio signal. For example, the audio component 610 includes a microphone (MIC) configured to receive an external audio signal when the electronic device 600 is in an operation mode, such as a call mode, a recording mode, and a voice recognition mode. The received audio signal may be further stored in the memory 604 or sent via the communication component 616. In some implementations, the audio component 610 also includes a speaker for outputting the audio signal.

The I/O interface 612 provides an interface between the processing component 602 and peripheral interface modules, such as a keyboard, a click wheel, buttons, and the like. These buttons may include, but are not limited to, a home button, a volume button, a starting button, and a locking button.

The sensor component 614 includes one or more sensors for providing status assessments of various aspects of the device 600. For example, the sensor component 614 can detect an open/closed status of the device 600, relative positioning of components, such as the display and the keypad of the electronic device 600. The sensor component 614 can also detect a change in position of one component of the device 600 or the device 600, the presence or absence of user contact with the device 600, an orientation, or an acceleration/deceleration of the device 600, and a change in temperature of the device 600. The sensor component 614 can include a proximity sensor configured to detect the presence of nearby objects without any physical contact. The sensor component 614 can also include a light sensor, such as a CMOS or CCD image sensor, configured to use in imaging applications. In some implementations, the sensor component 614 can also include an accelerometer sensor, a gyroscope sensor, a magnetic sensor, a pressure sensor, or a temperature sensor.

The communication component 616 is configured to facilitate wired or wireless communication between the device 600 and other devices. The device 600 can access a wireless network based on a communication standard, such as WiFi, an operator network (such as 2G; 3G; 4G or 5G), or a combination thereof. In some implementations, the communication component 616 receives broadcast signals or broadcast associated information from an external broadcast management system via a broadcast channel. In some implementations, the communication component 616 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some implementations, the device 600 may be implemented with one or more application specific integrated circuits (ASICs), digital signal processors (DSPs), digital signal processing devices (DSPDs), programmable logic devices (PLDs), field programmable Gate array (FPGA), controllers, microcontrollers, microprocessors or other electronic components to perform the above method.

In some implementations, there is also provided a non-transitory computer-readable storage medium including instructions, such as a memory 604 including instructions executable by the processor 620 of the device 600 to perform the above described method. For example, the non-transitory computer readable storage medium may be a ROM, a random access memory (RAM), a CD-ROM, a magnetic tape, a floppy disc, and an optical data storage device.

Those skilled in the art will easily think of other implementations of the disclosure after considering the specification and practicing the implementations disclosed herein. This disclosure is intended to cover any variations, uses, or adaptive changes of the disclosure. These variations, uses, or adaptive changes follow the general principles of the disclosure and include common knowledge or conventional technical means in the technical field not disclosed in the disclosure. The description and the implementations are only regarded as example, and the true scope and spirit of the disclosure are pointed out by the following claims.

It should be understood that the disclosure is not limited to the precise structure described above and shown in the drawings, and various modifications and changes can be made without departing from its scope. The scope of the disclosure is only limited by the appended claims.

What is claimed is:

1. A method for processing video data, comprising:
switching to a target anti-shake shooting mode in response to acquiring a switching operation in a video shooting interface, the target anti-shake shooting mode comprising at least one of following modes that are different from an anti-shake off mode: a first anti-shake shooting mode, and a second anti-shake shooting mode;
acquiring a video editing operation corresponding to the target anti-shake shooting mode, a video editing operation corresponding to the first anti-shake shooting mode being different from a video editing operation corresponding to the second anti-shake shooting mode;
obtaining target video data by processing the video data collected in real time based on the video editing operation, different video editing operations comprising operations which crop each frame of the video data with different aspect ratios; and
outputting the target video data in the video shooting interface.

2. The method according to claim 1, said acquiring a video editing operation corresponding to the target anti-shake shooting mode comprising:
determining a current anti-shake shooting mode, the current anti-shake shooting mode being one of following modes: the anti-shake off mode, the first anti-shake shooting mode, and the second anti-shake shooting mode;
determining the target anti-shake shooting mode based on the current anti-shake shooting mode in response to the switching operation, the switching operation being used to cycle through the anti-shake off mode, the first anti-shake shooting mode, and the second anti-shake shooting mode, and being triggered by clicking a same button in the video shooting interface;
switching the current anti-shake shooting mode to the target anti-shake shooting mode; and
acquiring the video editing operation corresponding to the target anti-shake shooting mode.

3. The method according to claim 1, wherein said obtaining target video data by processing the video data collected in real time based on the video editing operation comprising:
acquiring single frame images of the video data;
obtaining target single frame images by cropping the single frame image based on the video editing operation, wherein the video editing operation comprises the cropping operation; and generating the target video data based on the target single frame images.

4. The method according to claim 3, further comprising: determining the video editing operation by adjusting a cropping ratio of the cropping operation based on the target anti-shake shooting mode.

5. The method according to claim 1, further comprising: adjusting a video collection frame rate in response to the switching operation; and
collecting video data in real time based on the video collection frame rate.

6. The method according to claim 1, further comprising: acquiring a conversion operation for switching cameras; switching to a camera for collecting the video data in response to the conversion operation;
in response to the camera being a target camera, switching the anti-shake shooting mode to an anti-shake off mode; and
setting icon of the anti-shake shooting mode in the video shooting interface grayed.

7. Electric equipment, comprising:
a processor; and
a memory for storing instructions executable by the processor;
wherein, the processor is configured to:
switch to a target anti-shake shooting mode in response to acquiring a switching operation in a video shooting interface, the target anti-shake shooting mode comprising at least one of following modes that are different from an anti-shake off mode: a first anti-shake shooting mode, and a second anti-shake shooting mode;
acquire a video editing operation corresponding to the target anti-shake shooting mode, a video editing operation corresponding to the first anti-shake shooting mode being different from a video editing operation corresponding to the second anti-shake shooting mode;
obtain target video data by processing video data collected in real time based on the video editing operation, different video editing operations comprising operations which crop each frame of the video data with different aspect ratios; and
output the target video data in the video shooting interface.

8. The electric equipment according to claim 7, the processer is configured to:
determine a current anti-shake shooting mode, the current anti-shake shooting mode being one of following modes: the anti-shake off mode, the first anti-shake shooting mode, and the second anti-shake shooting mode;
determine the target anti-shake shooting mode based on the current anti-shake shooting mode in response to the switching operation, the switching operation being used to cycle through the anti-shake off mode, the first anti-shake shooting mode, and the second anti-shake shooting mode, and being triggered by clicking a same button in the video shooting interface;
switch the current anti-shake shooting mode to the target anti-shake shooting mode; and
acquire the video editing operation corresponding to the target anti-shake shooting mode.

9. The electric equipment according to claim 7, wherein the processor is configured to:
acquire single frame images of the video data;
obtain target single frame images by cropping the single frame image based on the video editing operation, wherein the video editing operation comprises the cropping operation; and
generate the target video data based on the target single frame images.

10. The electric equipment according to claim 9, wherein the processor is further configured to determine the video editing operation by adjusting a cropping ratio of the cropping operation based on the target anti-shake shooting mode.

11. The electric equipment according to claim 7, wherein the processor is further configured to:
adjust a video collection frame rate in response to the switching operation; and
collect the video data in real time based on the video collection frame rate.

12. The electric equipment according to claim 7, wherein the processor is further configured to:
acquire a conversion operation for switching cameras;
switch to a camera for collecting the video data in response to the conversion operation;
in response to the camera being a target camera, switch the anti-shake shooting mode to an anti-shake off mode; and
set icon of the anti-shake shooting mode in the video shooting interface grayed.

13. A non-transitory computer-readable storage medium having a computer instruction stored thereon, when the computer instruction being executed by a processor of electric equipment, enable the electric equipment to implement a method for processing video data,
the method for processing video data comprising:
switching to a target anti-shake shooting mode in response to acquiring a switching operation in a video shooting interface, the target anti-shake shooting mode comprising at least one of following modes that are different from an anti-shake off mode: a first anti-shake shooting mode, and a second anti-shake shooting mode;
acquiring a video editing operation corresponding to the target anti-shake shooting mode, a video editing operation corresponding to the first anti-shake shooting mode being different from a video editing operation corresponding to the second anti-shake shooting mode;
obtaining target video data by processing the video data collected in real time based on the video editing operation, different video editing operations comprising operations which crop each frame of the video data with different aspect ratios; and
outputting the target video data in the video shooting interface.

14. The computer-readable storage medium according to claim 13, said acquiring a video editing operation corresponding to the target anti-shake shooting mode comprising:
determining a current anti-shake shooting mode, the current anti-shake shooting mode being one of following modes: the anti-shake off mode, the first anti-shake shooting mode, and the second anti-shake shooting mode;
determining the target anti-shake shooting mode based on the current anti-shake shooting mode in response to the switching operation, the switching operation being used to cycle through the anti-shake off mode, the first anti-shake shooting mode, and the second anti-shake shooting mode, and being triggered by clicking a same button in the video shooting interface;

switching the current anti-shake shooting mode to the target anti-shake shooting mode; and acquiring the video editing operation corresponding to the target anti-shake shooting mode.

15. The computer-readable storage medium according to claim 13, said obtaining target video data by processing video data collected in real time based on the video editing operation comprising:

acquiring single frame images of the video data;

obtaining target single frame images by cropping the single frame image based on the video editing operation, wherein the video editing operation comprises the cropping operation; and generating the target video data based on the target single frame images, and wherein the method further comprises:

determining the video editing operation by adjusting a cropping ratio of the cropping operation based on the target anti-shake shooting mode.

16. The computer-readable storage medium according to claim 13, the method further comprising:

adjusting a video collection frame rate in response to the switching operation; and collecting the video data in real time based on the video collection frame rate.

17. The computer-readable storage medium according to claim 13, the method further comprising:

acquiring a conversion operation for switching cameras;

switching to a camera for collecting the video data in response to the conversion operation;

in response to the camera being a target camera, switching the anti-shake shooting mode to an anti-shake off mode; and setting icon of the anti-shake shooting mode in the video shooting interface grayed.

18. The method according to claim 1, further comprising:

in response to a shooting area of a camera used to determine the first anti-shake shooting mode being smaller than a shooting area of a camera used to determine the second anti-shake shooting mode, cropping the each frame of the video data in the first anti-shake shooting mode with a first ratio and cropping the each frame of the video data in the second anti-shake shooting mode with a second ratio, wherein the first ratio is smaller than the second ratio.

19. The electric equipment according to claim 7, wherein the processor is further configured to:

in response to a shooting area of a camera used to determine the first anti-shake shooting mode being smaller than a shooting area of a camera used to determine the second anti-shake shooting mode, crop the each frame of the video data in the first anti-shake shooting mode with a first ratio and crop the each frame of the video data in the second anti-shake shooting mode with a second ratio, wherein the first ratio is smaller than the second ratio.

20. The computer-readable storage medium according to claim 13, wherein the method further comprises:

in response to a shooting area of a camera used to determine the first anti-shake shooting mode being smaller than a shooting area of a camera used to determine the second anti-shake shooting mode, cropping the each frame of the video data in the first anti-shake shooting mode with a first ratio and cropping the each frame of the video data in the second anti-shake shooting mode with a second ratio, wherein the first ratio is smaller than the second ratio.

* * * * *